Figure 1:
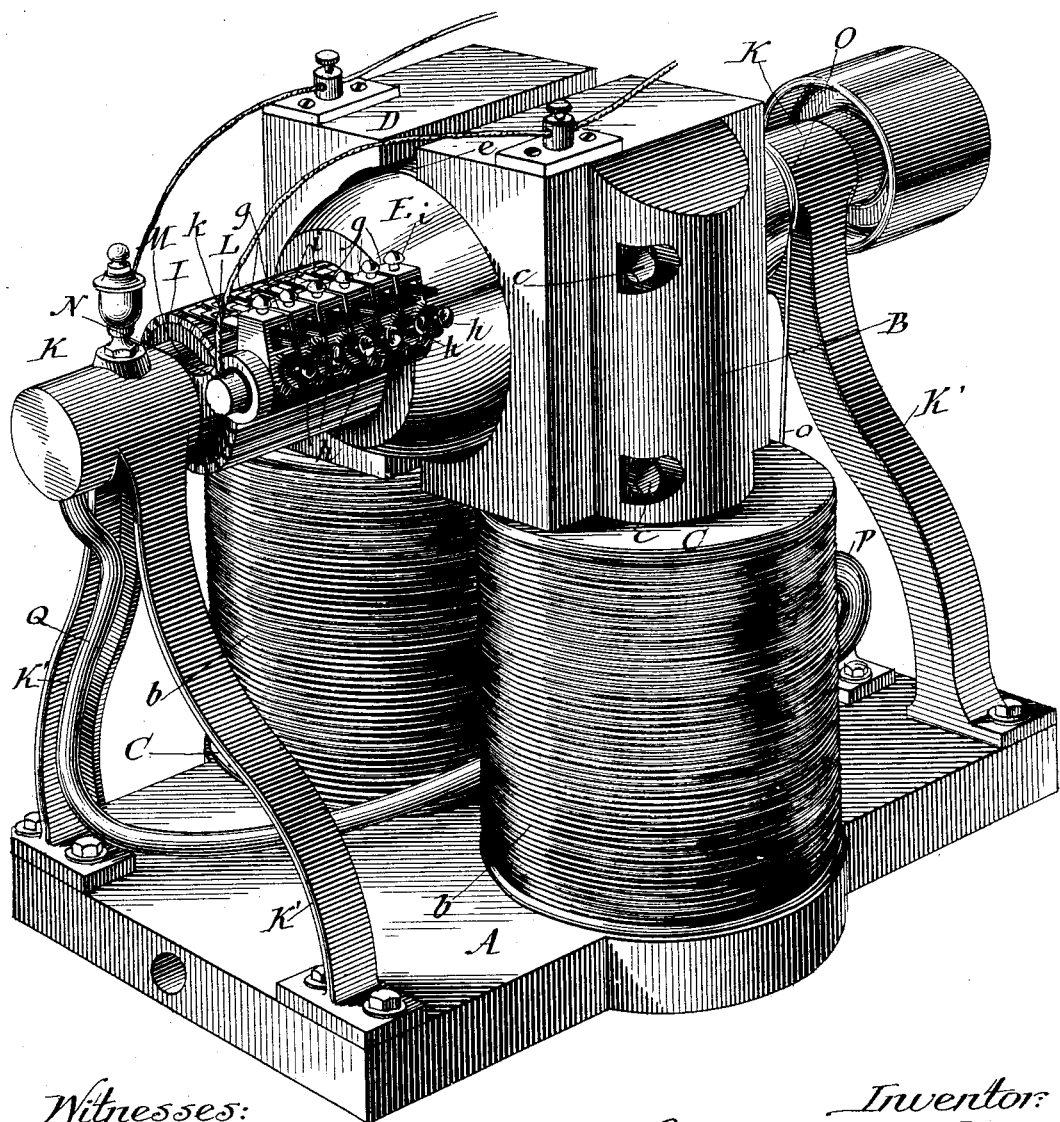

(No Model.) 4 Sheets—Sheet 1.

M. C. BURT.
DYNAMO ELECTRIC MACHINE.

No. 463,242. Patented Nov. 17, 1891.

Witnesses:
Frank J. Blanchard
Chas. O. Theroey.

Inventor:
Martin C. Burt (No Model.) 4 Sheets—Sheet 2.

M. C. BURT.
DYNAMO ELECTRIC MACHINE.

No. 463,242. Patented Nov. 17, 1891.

Witnesses:
Frank J. Blanchard
Chas. O. Hervey

Inventor:
Martin C. Burt (No Model.) 4 Sheets—Sheet 3.
M. C. BURT.
DYNAMO ELECTRIC MACHINE.
No. 463,242. Patented Nov. 17, 1891.
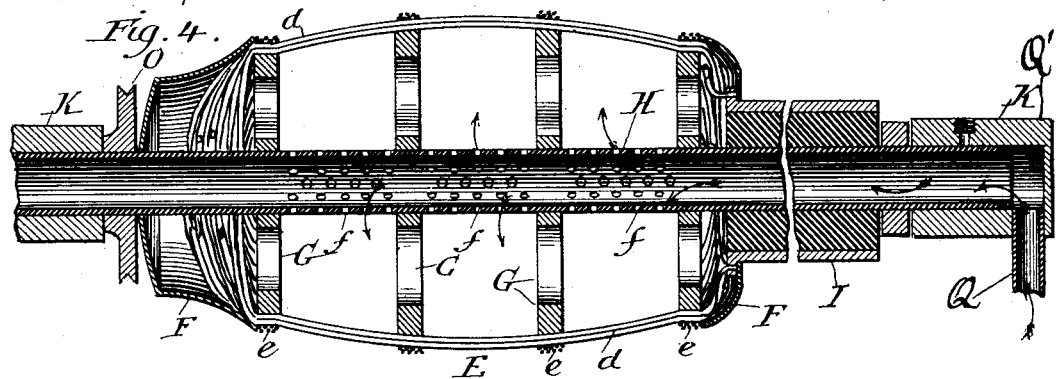
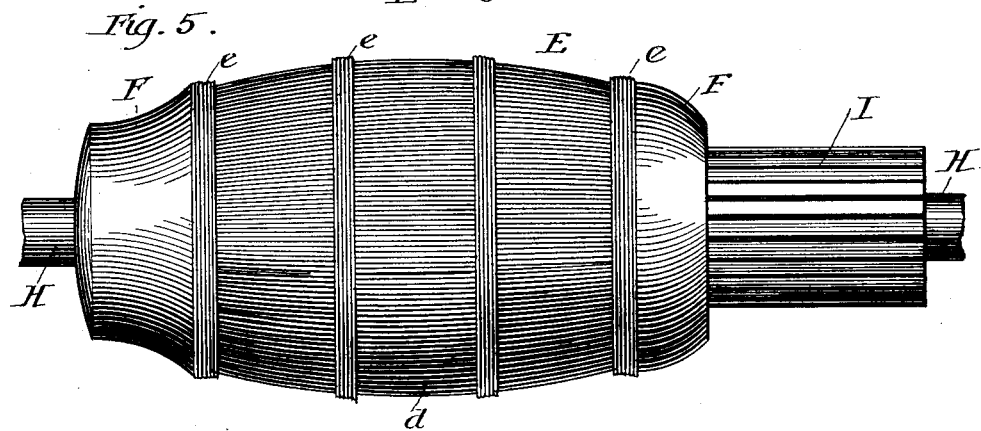
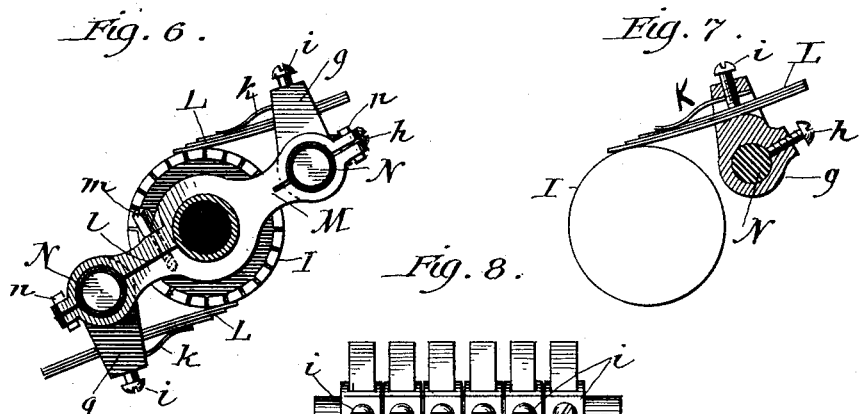
Witnesses:
Frank J. Blanchard
Chas. C. Hervey
Inventor:
Martin C. Burt

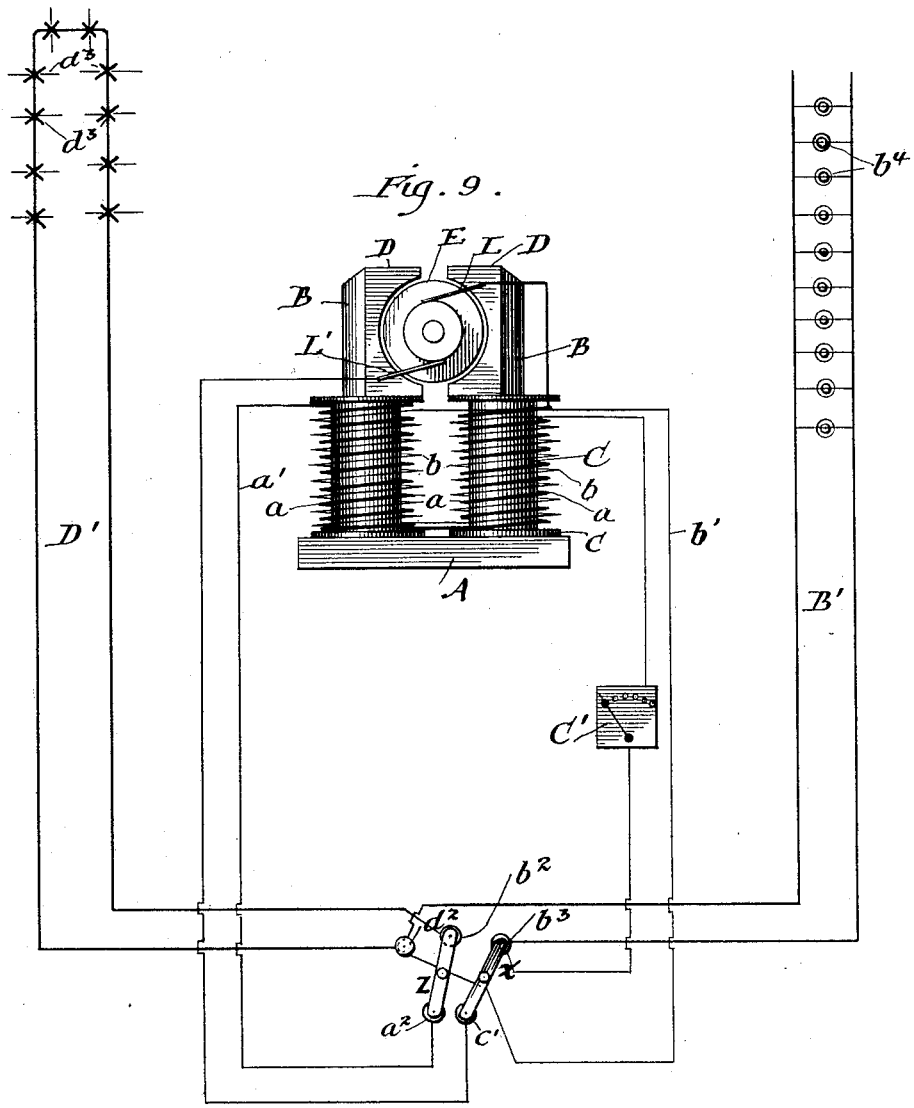

UNITED STATES PATENT OFFICE.

MARTIN C. BURT, OF CHICAGO, ILLINOIS.

DYNAMO-ELECTRIC MACHINE.

SPECIFICATION forming part of Letters Patent No. 463,242, dated November 17, 1891.

Application filed January 21, 1891. Serial No. 378,605. (No model.)

*To all whom it may concern:*

Be it known that I, MARTIN C. BURT, a citizen of the United States of America, residing at Chicago, in the county of Cook and State of Illinois, have invented certain new and useful Improvements in Dynamo-Electric Machines, of which the following is a specification.

My invention relates to certain improvements applicable to dynamos or electric motors, which improvements have for their object, first, certain improvements in the framework of such machines whereby a cheap, rigid, and powerful frame may be obtained; second, certain improvements in the construction of armatures and certain attachments therefor by means of which the armature, commutator, and coils upon the former may be kept cool and free from dust and filings in order that the maximum efficiency and safety may be attained, and, third, certain improvements in the outside wiring, whereby a single dynamo may be made to do the work of two or more and the power of the machine increased to meet the added requirement of the increased work. In addition to these main improvements I have also made certain minor improvements—as, for instance, in the mounting of the brushes and other portions— all of which will be clearly set forth in the following description.

My preferred construction is shown in the drawings presented herewith by means of nine figures, of which—

Figure 2:
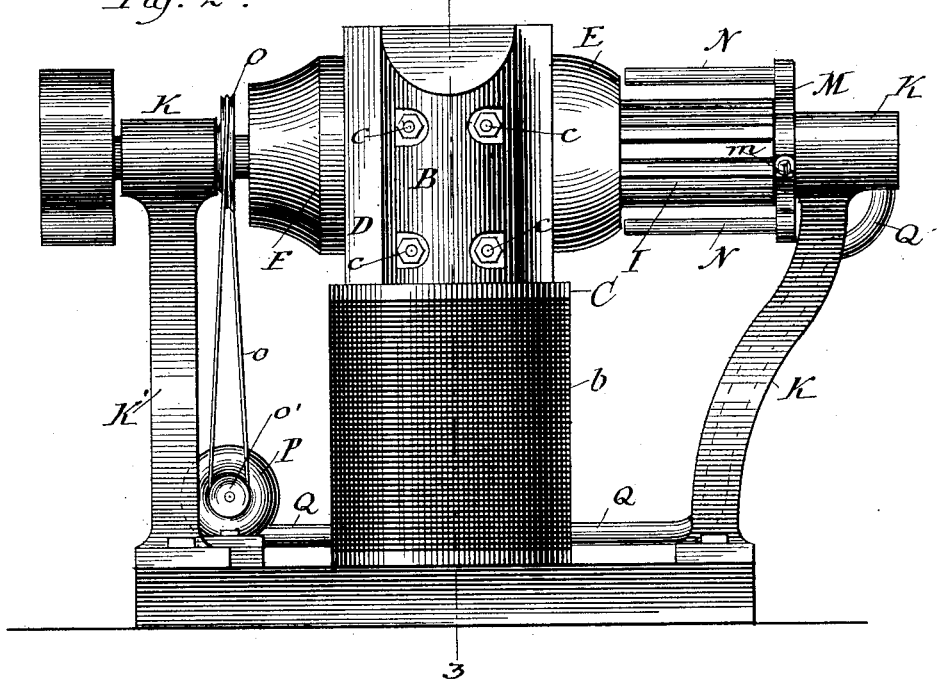
Figure 3:
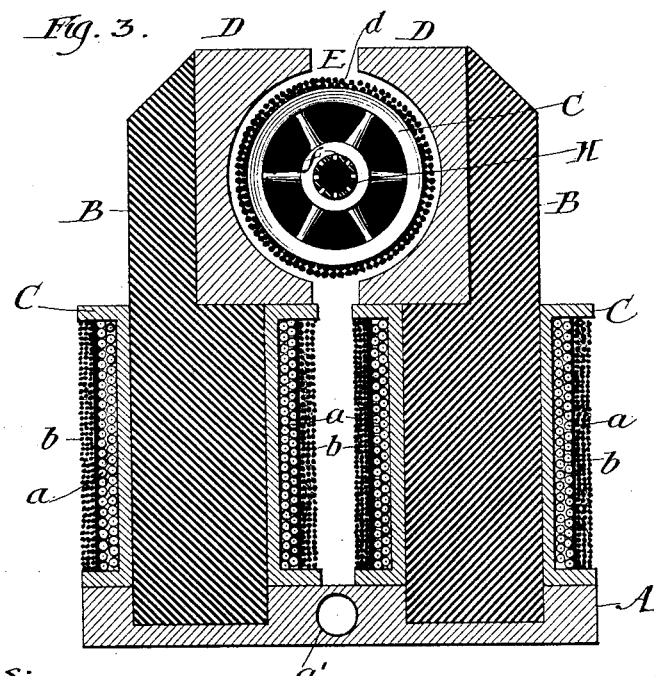

Figure 1 is a perspective of a complete machine. Fig. 2 is a side elevation of the machine with the brushes removed. Fig. 3 is a vertical transverse section in line 3 3 of Fig. 2. Fig. 4 is an axial section of the armature and its bearings. Fig. 5 is a side view of the armature and commutator. Fig. 6 is a detail cross-section, showing the mounting of the brushes. Fig. 7 is a similar section through one of the brushes. Fig. 8 is a plan of one of the brushes; and Fig. 9 is a skeleton view, showing certain improvements in the outside wiring of the dynamo.

The frame of the dynamo is made up of a solid base A, having field-cores B firmly mortised therein, preferably by casting the base about said cores. Spools C encircle the cores above the base, and pole-pieces D are secured to the portions extending above said spools by means of bolts $c$. Standards K' K' are bolted to the base A and terminate in journal-boxes K, in which a shaft H, supporting the armature, is journaled. This shaft is shown as hollow, and one of the boxes K is closed at the end, as seen at the right in Fig. 4. The shaft bears a pulley O, which is geared to a rotary fan P, the eduction-port of which leads into a pipe Q, which passes upward along one of the legs K' and empties at Q' into the inclosed journal-box at that end of the shaft. The hollow shaft is itself closed at the other end, and the portion of the shell within the armature is perforated, as seen at $f$, to allow the air from the fan to escape into the interior of the armature. The armature itself may be provided with a core of any of the well-known forms, providing the same contains openings to allow the air to pass through to the wires. The form shown here is merely a skeleton and may or may not be used, as preferred. Whatever form is used, however, it is preferable to make it slightly bulging or barrel-shaped, in order that in winding the wires they may be spread apart more at the portion where the greatest danger is encountered. To prevent the air which is blown in through the armature-shaft from escaping, the ends of the armature-coils are inclosed by tight boxes F, which also add to the beauty and durability of the machine. The brushes L are carried by a yoke M, turning freely upon the armature-shaft, which is slit, as seen at $l$, and provided with a set-screw $m$ to take up the wear and avoid any play upon the shaft. This yoke is secured by appropriate means to the adjacent journal-box to prevent it from rotating with the shaft.

It is often desirable to change the capacity of the brushes, and it is always necessary that the same should be perfectly adjustable and placed firmly and evenly upon the commutator. I have attained all of these objects by means of a construction which is clearly illustrated in Figs. 6, 7, and 8. The yoke M has circular holes in its opposite ends and is slit through said holes, as seen in Fig. 6. Pins N are inserted in these holes and clamped therein by means of the bolts $n$, by means of which the slit portions of the yoke are brought together. Upon these pins blocks $g$ are mounted and held in place by set-screws $h$. These blocks are slotted in their upper portions to accommodate the brushes L, which are held in position by set-screws $i$ and which are regularly and evenly pressed upon the commutator by means of springs $k$. The brushes may be adjusted separately, first, by means of the set-screw $i$ to take up the wear; second, by means of the set-screw $h$ to press them firmly upon the commutator; and they may be also adjusted all together and uniformly by means of the bolts $n$. When any of the brushes are to be thrown out of action, the set-screw $h$ is loosened and the brush swung away from the commutator and secured in its new position.

It is frequently desirable, in the use of a dynamo furnishing current for a series of lights or other work which does not require any particular regulation of the current, to make use of the same for additional purposes, which require such regulation and which also entail further work upon the generator. I have provided means for accomplishing this by double-winding the field-cores, interposing a rheostat in one of the windings, and providing a system of switches by means of which the work requiring a regulated current may be thrown into the circuit simultaneously with the field-winding containing the rheostat. Fig. 9 illustrates how this may be done and shows a series-wound dynamo provided also with a shunt-winding containing a rheostat $C'$.

The main circuit is indicated by heavy lines and the shunt-circuit by lighter lines. Commencing with the upper brush, or the one marked L, the current passes downward to the field-coil directly beneath it, from the bottom of said coil across to the left-hand coil, and, after leaving the latter, proceeds downward, as seen at $a'$, to a post $a^2$, upon which swings a switch Z, capable of connecting the post $a^2$ with either of two posts marked $b^2$ and $d^2$, respectively. In the drawings the connection is with the post $b^2$, and from that the current passes to the circuit $D'$, thence back to the post $d^2$, where it separates, a portion traversing the shunt-circuit $b'$ and the remainder the circuit $B'$. From both of these it returns to a post $b^3$, connected by a switch $x$ with a post $c'$, from which it returns to the dynamo through the brush $L'$. This shows both outside circuits in use, and also the shunt-circuit $b'$, containing the rheostat $C'$, by means of which the exciting force of the dynamo may be regulated. The switch $x$ may be swung upon the post $c'$ to connect the latter with the post $b^2$, and to throw both the shunt-circuit and the outside circuit $B'$ out both switches are swung to the left, the switch Z then resting upon the post $d^2$ and the switch $x$ upon this post $b^2$. The current now leaving the field-coil passes from the post $a^2$ to the post $d^2$, thence through the circuit $D'$ back to the post $b^2$, thence through the switch $x$ to the post $c'$, and back to the dynamo.

I claim as new and desire to secure by Letters Patent—

1. The combination, in an electric motor or dynamo, of a hollow armature-shaft, a blower P, geared to said shaft and having its eduction-pipe connected with the interior of the shaft, openings in the shaft within the armature, and an armature upon said shaft tightly closed at the ends and loosely wound between the same, substantially as described.

2. The combination, with an electric dynamo and an outside circuit, of a supplementary shunt-winding upon the field-coils, a second outside circuit, and a system of switches, whereby the shunt-winding and the second circuit may be simultaneously thrown into or out of operation, substantially as described.

3. The combination, with an electric dynamo and an outside circuit, of a supplementary shunt-winding upon the field-coils of the dynamo, said shunt-circuit containing means for regulating the resistance, a second outside circuit, and a system of switches by means of which the shunt-circuit and the second outside circuit may be simultaneously thrown into or out of the first circuit, substantially as described.

4. The combination, in an electric motor or dynamo, of a hollow armature-shaft, a suitably-operated blower having its eduction-pipe connected with the interior of the shaft, openings in the shaft within the armature, and an armature upon said shaft tightly closed at the ends and loosely wound between the same, substantially as described.

MARTIN C. BURT.

In presence of—
RUFUS KING,
GEO. P. SMITH.